(12) United States Patent
Umekawa et al.

(10) Patent No.: US 11,191,326 B2
(45) Date of Patent: Dec. 7, 2021

(54) MARKING DEVICE AND METHOD, AND METHOD FOR MANUFACTURING FASTENER CHAIN

(71) Applicant: YKK Corporation, Tokyo (JP)

(72) Inventors: Toru Umekawa, Kurobe (JP); Hiroshi Ishisaka, Kurobe (JP)

(73) Assignee: YKK Corporation, Tokyo (JP)

( * ) Notice: Subject to any disclaimer, the term of this patent is extended or adjusted under 35 U.S.C. 154(b) by 462 days.

(21) Appl. No.: 16/319,126

(22) PCT Filed: Jul. 21, 2016

(86) PCT No.: PCT/JP2016/071429
§ 371 (c)(1),
(2) Date: Jan. 18, 2019

(87) PCT Pub. No.: WO2018/016057
PCT Pub. Date: Jan. 25, 2018

(65) Prior Publication Data
US 2020/0297079 A1 Sep. 24, 2020

(51) Int. Cl.
| | |
|---|---|
| *B41J 2/325* | (2006.01) |
| *A44B 19/60* | (2006.01) |
| *A44B 19/34* | (2006.01) |
| *B41J 3/407* | (2006.01) |
| *B41J 11/00* | (2006.01) |
| *A44B 19/02* | (2006.01) |

(Continued)

(52) U.S. Cl.
CPC .............. *A44B 19/60* (2013.01); *A44B 19/34* (2013.01); *B41J 2/325* (2013.01); *B41J 3/407* (2013.01); *B41J 11/008* (2013.01); *A44B 19/02* (2013.01); *A44B 19/26* (2013.01); *B29L 2005/00* (2013.01); *D10B 2501/0631* (2013.01)

(58) Field of Classification Search
CPC . B41J 11/008; B41J 3/407; B41J 2/325; B41J 11/46; B41J 11/0045; B41J 11/00; B41J 11/001; B41J 11/0025; B41J 11/003; B41J 11/0035; B41J 11/004; B41J 11/007; B41J 11/005; B41J 11/0055; B41J 11/006; B41J 11/0065; B41K 3/00; B41K 3/04; B41F 17/10; A44B 19/42
See application file for complete search history.

(56) References Cited

FOREIGN PATENT DOCUMENTS

| | | |
|---|---|---|
| CN | 103960833 A | 8/2014 |
| EP | 1253010 A1 | 10/2002 |

(Continued)

OTHER PUBLICATIONS

International Search Report, PCT Patent Application No. PCT/JP2016/071429, dated Sep. 20, 2016.

(Continued)

*Primary Examiner* — Kristal Feggins
(74) *Attorney, Agent, or Firm* — Kilpatrick Townsend & Stockton LLP

(57) ABSTRACT

A marking device performs a marking process onto a long object. The marking device includes a driving source and a marking unit that performs a circular motion in accordance with a driving force supplied from the driving source. While the long object is being transferred, marks are applied onto the long object in accordance with the circular motion of the marking unit. An extent of interference by the marking unit to the transfer of the long object is reduced, thus facilitating higher speed transfer of the long object.

14 Claims, 12 Drawing Sheets

(51) Int. Cl.
  *A44B 19/26*  (2006.01)
  *B29L 5/00*  (2006.01)

(56) References Cited

FOREIGN PATENT DOCUMENTS

| | | |
|---|---|---|
| JP | S60-178053 A | 9/1985 |
| JP | H08-126503 A | 5/1996 |
| JP | H09-183264 A | 7/1997 |
| JP | 3190157 U | 3/2014 |
| WO | 2014/091607 A1 | 6/2014 |

OTHER PUBLICATIONS

International Preliminary Report on Patentability, PCT Patent Application No. PCT/JP2016/071429, dated Jan. 31, 2019.
Office Action, Chinese Patent Application No. 201680087798.5, dated Mar. 27, 2020.

| Count value | Driving Signal |
|---|---|
| 0~10 | 1 |
| 10~20 | 2 |
| 20~30 | 3 |
| 30~40 | 4 |
| 40~50 | 5 |
| . . . | . . . |
| . . . | . . . |
| . . . | . . . |

MARKING DEVICE AND METHOD, AND METHOD FOR MANUFACTURING FASTENER CHAIN

TECHNICAL FIELD

The present disclosure is related to device and method of marking, and a method of manufacturing a fastener chain.

BACKGROUND ART

There are needs to apply marks at desired locations in an elongated fastener chain so as to indicate sewing positions for a slide fastener relative to predetermined locations on a cover that may cover a vehicle seat or sofa and the like.

PTL 1 discloses a device for marking a slide fastener. The document discloses that transfer distance of fastener chain is measured, and position of printing is controlled based on the measurement. FIG. 4 of this document discloses a configuration of a printing head. A hot-pressing unit 143 moves toward a fastener chain, and the hot-pressing unit 143 presses an ink foil 144 to the fastener chain so that an image 144 is transcribed to the fastener chain (See para. 0021 of the same document).

A marking device 1 disclosed in PTL 2 has a base 31 movable in an elongated direction of a slide fastener, and a marking unit 4 mounted to the base 31. In the marking unit 4, a head 41 presses a film (F) to a fastener tap 61.

CITATION LIST

Patent Literature

[PTL 1] European Patent Application Laid-open No. 1,253,010 Specification
[PTL 2] Japanese Registered Utility-model No. 3,190,157

SUMMARY

Technical Problem

In the disclosed marking device of PTL 1, the ink foil is required to be pressed to the fastener chain in a direction perpendicular to the transfer direction of the fastener chain. In order to achieve better or more stable marking, the fastener chain may be required to be transferred at a slower speed, or it may be required to stop the transfer of fastener chain each time of marking.

The present inventors have newly discovered a value in promoting higher speed transfer of a long object such as a fastener chain while reducing an extent of interference by a marking unit to the transfer of the long object.

Solution to Problem

A marking device according to an aspect of the present disclosure may be a marking device that performs a marking process onto a long object, the marking device comprising:
  a driving source; and
  a marking unit that performs a circular motion in accordance with a driving force supplied from the driving source, wherein
  while the long object is being transferred, marks are applied onto the long object in accordance with the circular motion of the marking unit.
In some cases, a time period during which the marking unit performs a circular motion so as to apply a Mth mark (M indicates two or more integer) onto the long object includes a time period during which the marking unit performs a circular motion at a speed that is in accordance with a distance between a M−1th mark and the Mth mark.

In some cases, a circular motion speed of the marking unit is set to be substantially equal to a transfer speed of the long object at least when the marking unit performs a circular motion so as to approach the long object.

In some cases, further provided is a controller that supplies to the driving source a drive signal that indicates an absolute position on a locus of one round of circular motion of the marking unit and that changes in accordance with an increase of transfer distance of the long object.

In some cases, the driving source has a rotational axis, and the marking unit receives a rotational force from the driving source at a non-coaxial position offset to the rotational axis of the driving source.

In some cases, further provided is a XY stage that supports the marking unit such that the marking unit is allowed to perform a circular motion.

In some cases, the marking unit has at least one protrusion, and the mark is formed through the protrusion pressing, to a side the long object, a ribbon supplied between the marking unit and the long object.

In some cases, the long object is a slide fastener, or a fastener chain for slide fastener, or a fastener stringer for slide fastener.

A marking method according to another aspect of the present disclosure is a marking method of performing a marking process onto a long object, the method comprising:
  transferring the long object by at least a pair of rolls; and
  continuously applying marks onto the long object, while the long object is being transferred, based on a circular motion of a marking unit.

In some cases, a time period during which the marking unit performs a circular motion so as to apply a Mth mark (M indicates two or more integer) onto the long object includes a time period during which the marking unit performs a circular motion at a speed that is in accordance with a distance between a M−1th mark and the Mth mark.

In some cases, a circular motion speed of the marking unit is set to be substantially equal to a transfer speed of the long object at least when the marking unit performs a circular motion so as to approach the long object.

In some cases, further included are:
  detecting a transfer distance of the long object while the long object is being transferred; and
  supplying a drive signal to a driving source that provides a driving force to the marking unit, wherein
  the drive signal indicates an absolute position on a locus of one round of circular motion of the marking unit and changes in accordance with an increase of the detected transfer distance of the long object.

In some cases, the marking unit has at least one protrusion, and the mark is formed through the protrusion pressing, to a side the long object, a ribbon supplied between the marking unit and the long object.

In some cases, the long object is a slide fastener, or a fastener chain for slide fastener, or a fastener stringer for slide fastener.

A method of manufacturing a fastener chain according to still another aspect of the present disclosure is a method of manufacturing a fastener chain in which plural marks are applied along its elongated direction, the method comprising:
  transferring the fastener chain by at least a pair of rolls; and continuously applying marks onto at least one fastener tape of the fastener chain based on a circular motion of a marking unit.

In some cases, a time period during which the marking unit performs a circular motion so as to apply a Mth mark (M indicates two or more integer) to the fastener chain includes a time period during which the marking unit performs a circular motion at a speed that is in accordance with a distance between a M−1th mark and the Mth mark.

In some cases, a circular motion speed of the marking unit is set to be substantially equal to a transfer speed of the fastener chain at least when the marking unit performs a circular motion so as to approach the fastener chain.

Advantageous Effects of Invention

According to an aspect of the present disclosure, higher speed transfer of a long object such as a fastener chain may be promoted while an extent of interference by a marking unit to the transfer of the long object is reduced.

BRIEF DESCRIPTION OF DRAWINGS

FIG. 11 (a) illustrates a fastener chain to which marks are applied at time T1 in FIG. 10; FIG. 11 (b) illustrates a fastener chain to which marks are applied at time T2 in FIG. 10; and FIG. 11 (c) illustrates a fastener chain to which marks are applied at time T3 in FIG. 10.

DESCRIPTION OF EMBODIMENTS

Hereinafter, non-limiting exemplary embodiments of the present invention will be described with references to FIGS. 1 to 15. Disclosed one or more exemplary embodiments and respective features included in the exemplary embodiments are not mutually exclusive. A skilled person would properly combine the respective exemplary embodiments and/or respective features without requiring excess descriptions. Furthermore, a skilled person would also understand synergic effect by such combination. Overlapping descriptions among exemplary embodiments will be basically omitted. Referenced drawings are mainly for the purpose of illustrating an invention and may possibly be simplified for the sake of convenience of illustration.

FIGS. 1-12 will be described as a first exemplary embodiment, and FIG. 13 will be described as a second exemplary embodiment as a variation of the first exemplary embodiment. Suggestions on diverse variations would be described while describing the first and/or second exemplary embodiments. Description of variation about one configuration or operation or material may not be independent and may possibly be combined with description of variation on another configuration or operation or material. Suggestion of variation of first exemplary embodiment may be combined with suggestion of another variation of first exemplary embodiment, the second exemplary embodiment or suggestion of variation on second exemplary embodiment.

Figure 1:
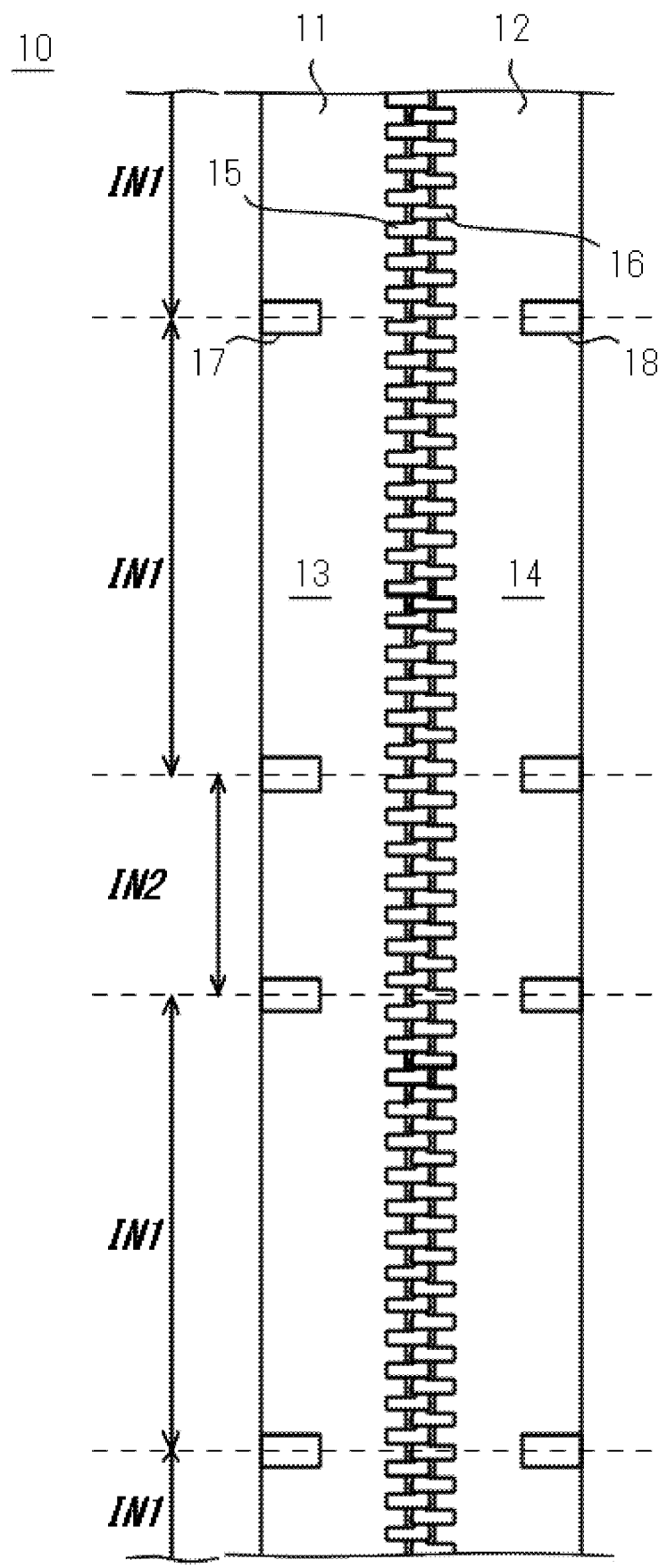
FIG. 1 is a schematic elevational view of a fastener chain to which plural marks are applied by a marking device according to an aspect of the present disclosure.
Figure 2:
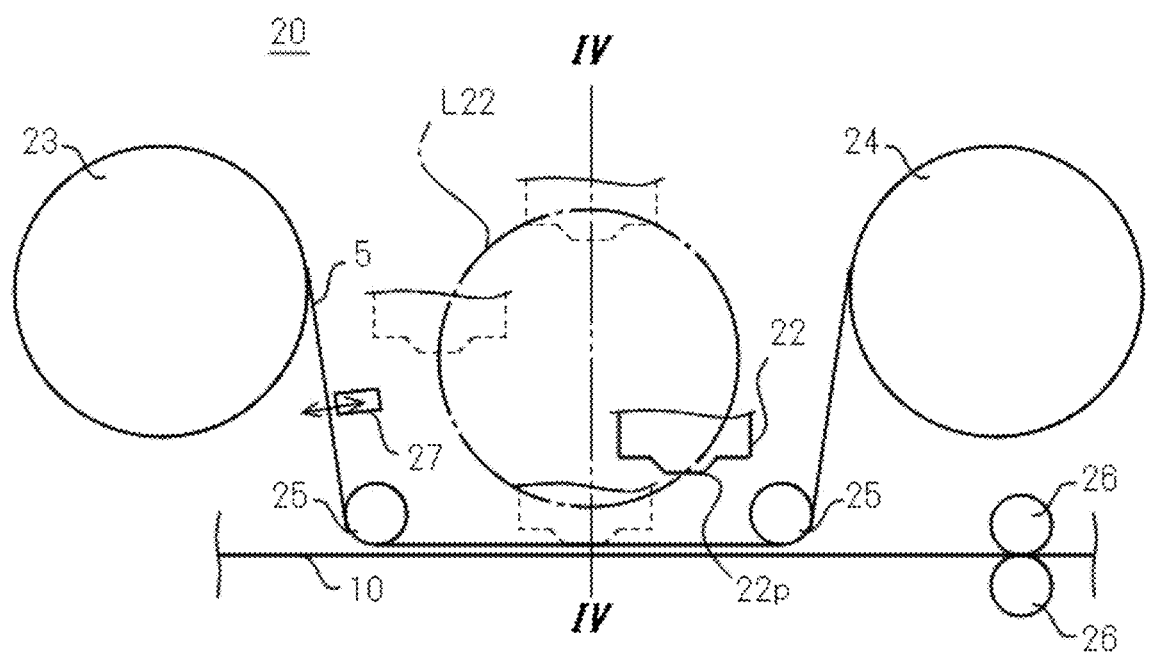
FIG. 2 is a view illustrating a schematic configuration of a marking device according to an aspect of the present disclosure. In particular, schematically illustrated is that a marking unit performs a circular motion.
Figure 3:
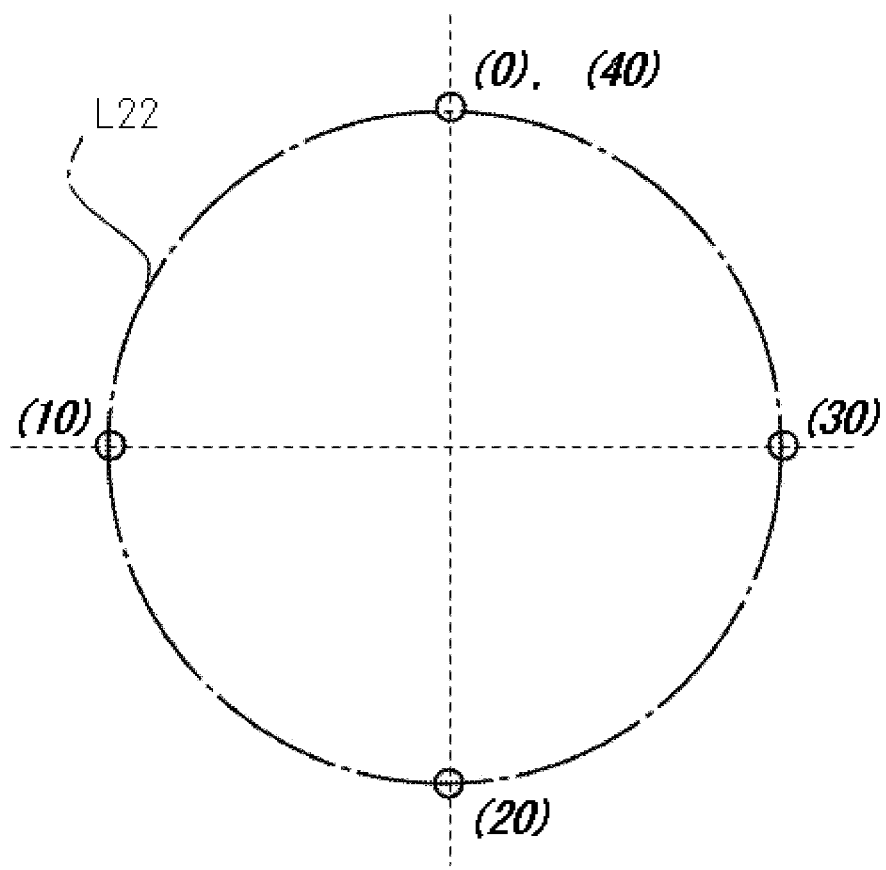
FIG. 3 is a schematic view illustrating a locus of circular motion of a marking unit of a marking device according to an aspect of the present disclosure. In particular, top dead center (0), midpoint (10) of going travel, bottom dead center (20), and midpoint (30) of returning travel, and an end point (40) on the locus of one round of circular motion of a marking unit are schematically illustrated. The end point (40) matches the top dead center (0).
Figure 4:
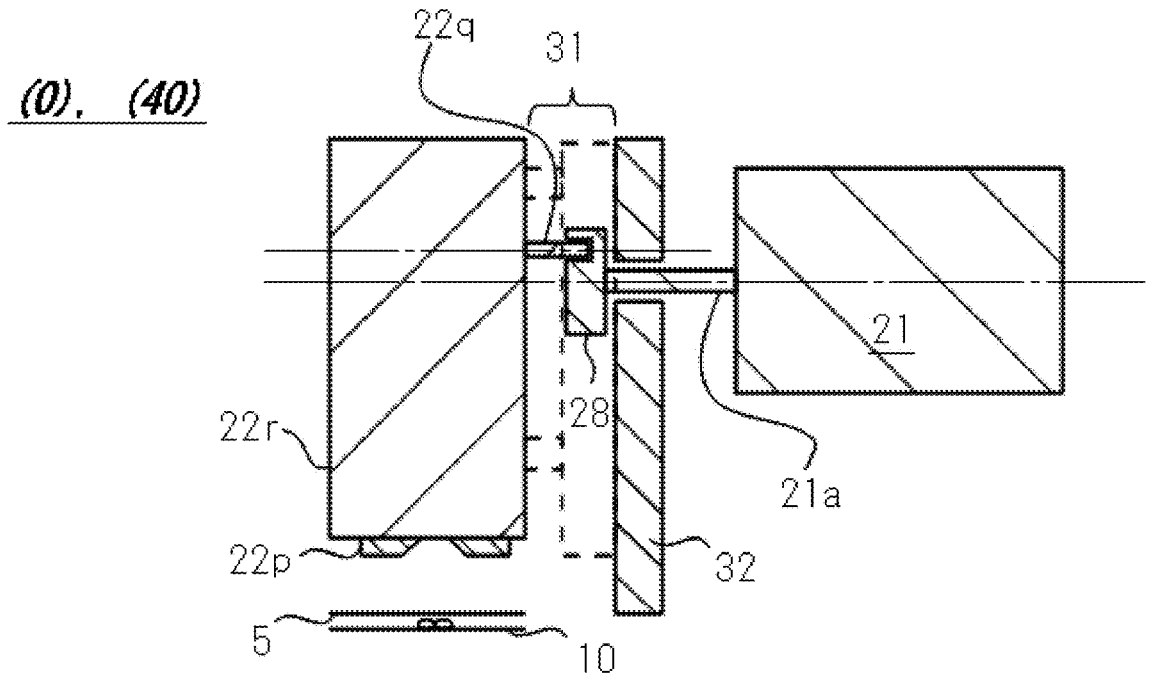
FIG. 4 illustrates a schematic configuration of a marking device taken along a chain double-dashed line IV-IV in FIG. 2. The marking unit is positioned at a top dead center (0) on a locus of circular motion of a marking unit.
Figure 5:
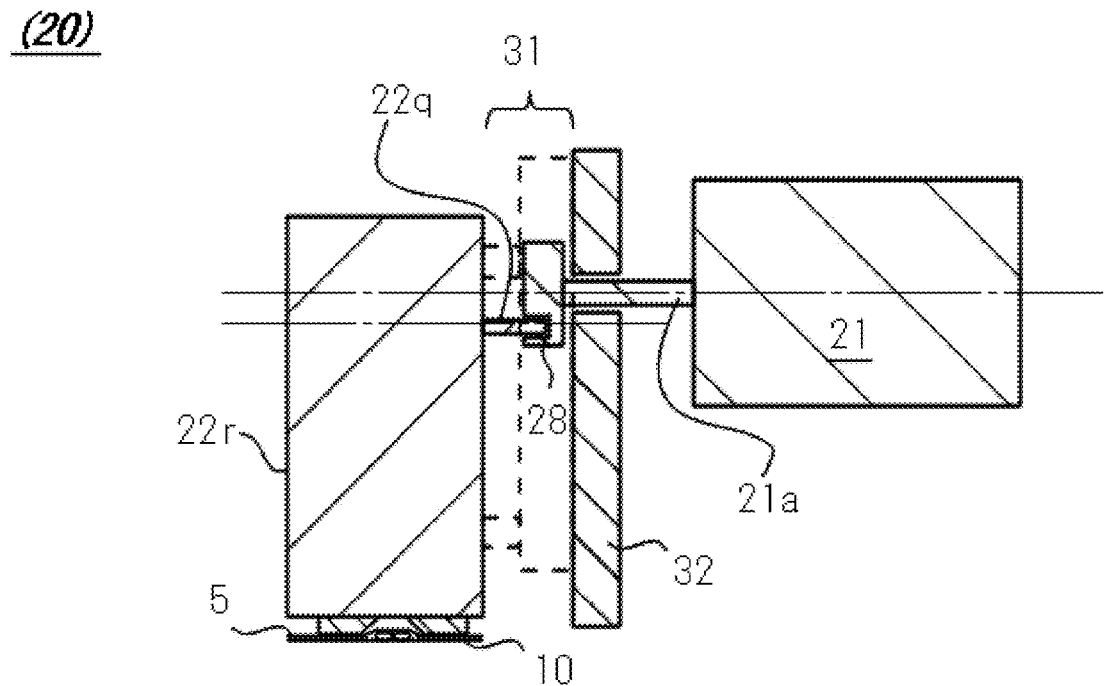
FIG. 5 illustrates a schematic configuration of a marking device taken along a chain double-dashed line IV-IV in FIG. 2. Unlike the case of FIG. 4, the marking unit is positioned at a bottom dead center (20) on a locus of circular motion of a marking unit.
Figure 6:
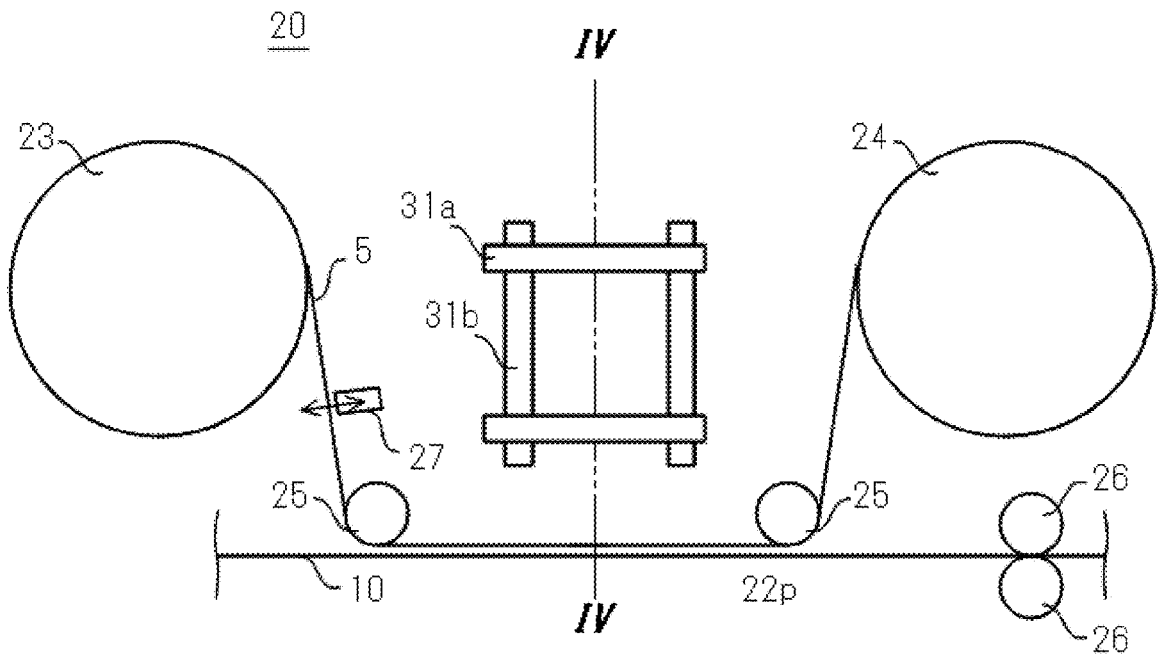
FIG. 6 is a view illustrating a schematic configuration of a marking device according to an aspect of the present disclosure. In particular, a manner of arrangement of a XY stage is schematically illustrated.
Figure 7:
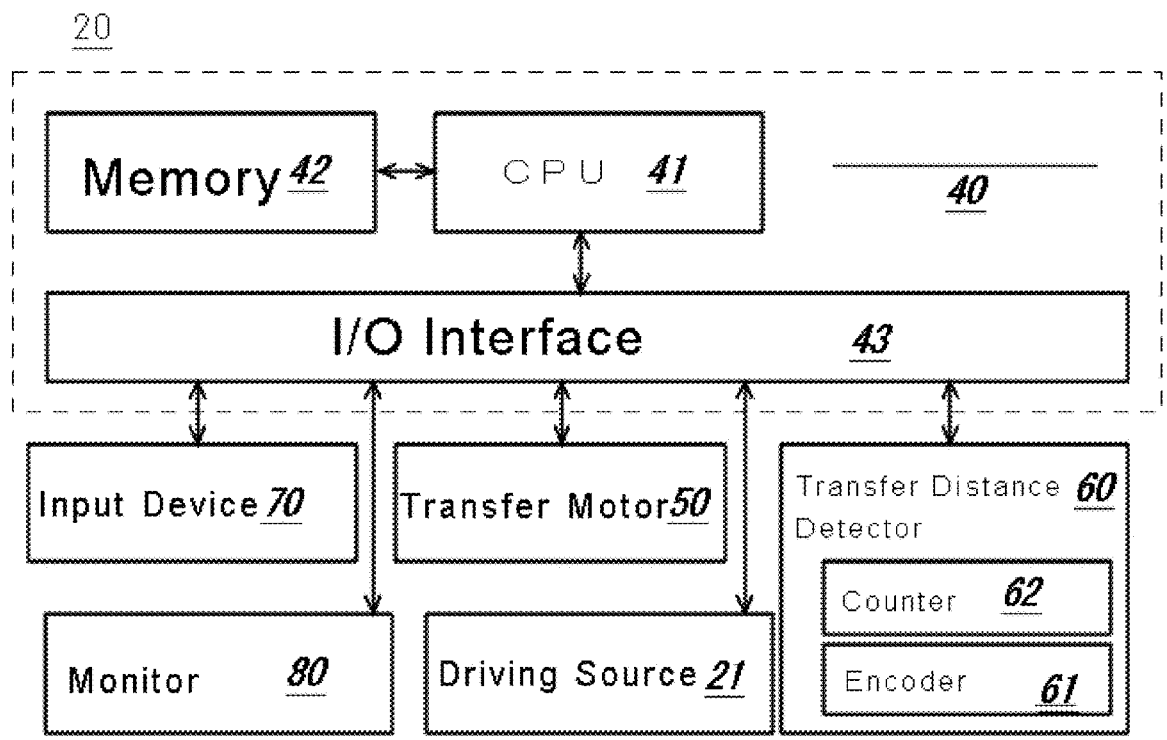
FIG. 7 is a block diagram illustrating a schematic system configuration of a marking device according to an aspect of the present disclosure.
Figures 8, 9:
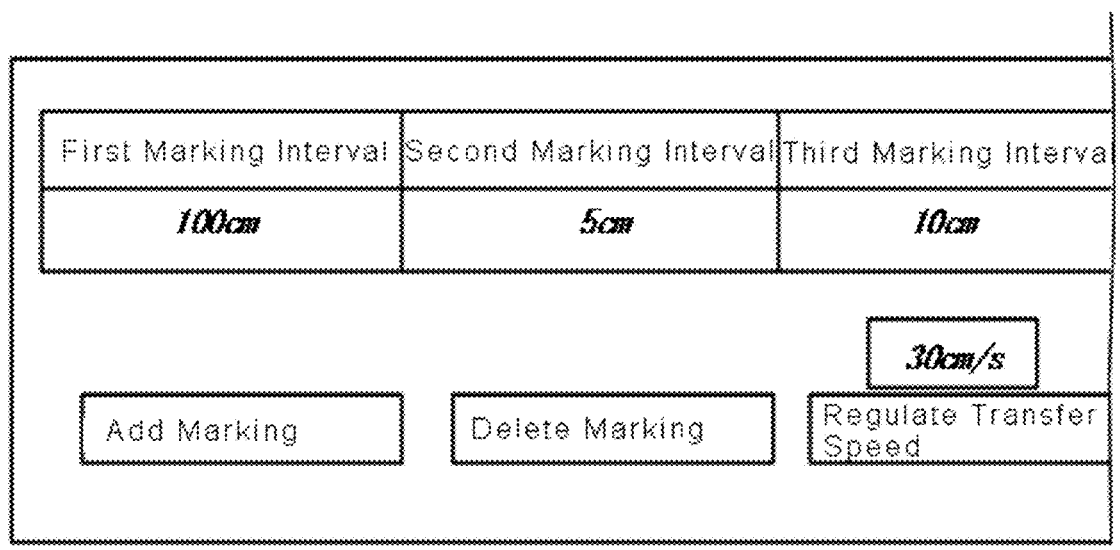
FIG. 8 illustrates an exemplary table in which relationships are defined between count values indicative of transfer distance of a fastener chain and drive signals corresponding to the count values.
FIG. 9 is a schematic view illustrating a portion of an exemplary screen displayed by a monitor of a marking device.
Figure 10:
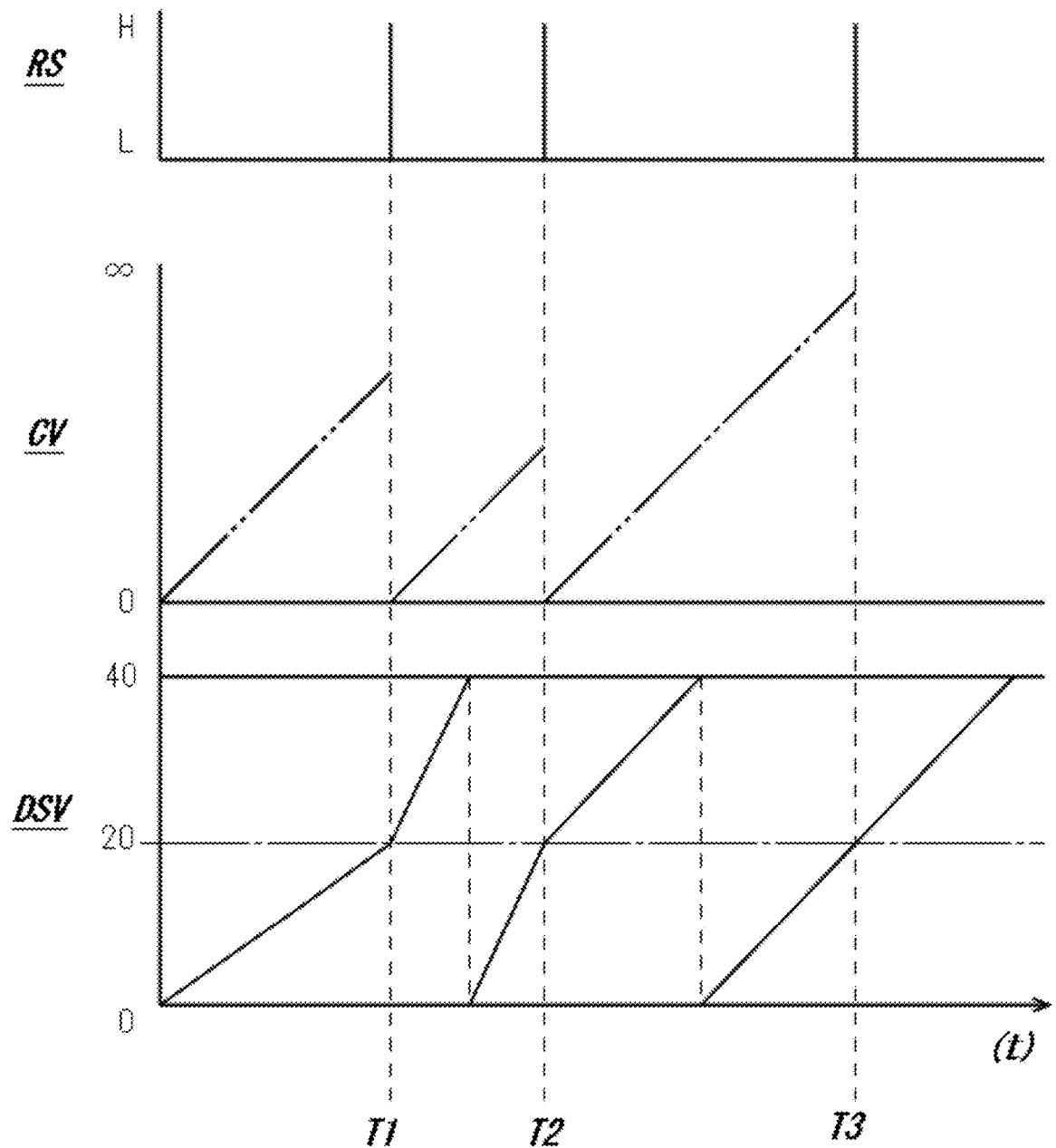
FIG. 10 is a schematic time chart for illustrating schematic operation of a marking device, illustrating that drive signal value (DSV) and count value (CV) are changed as a function of time, and count value (CV) is reset by a reset signal (RS).
Figure 11:
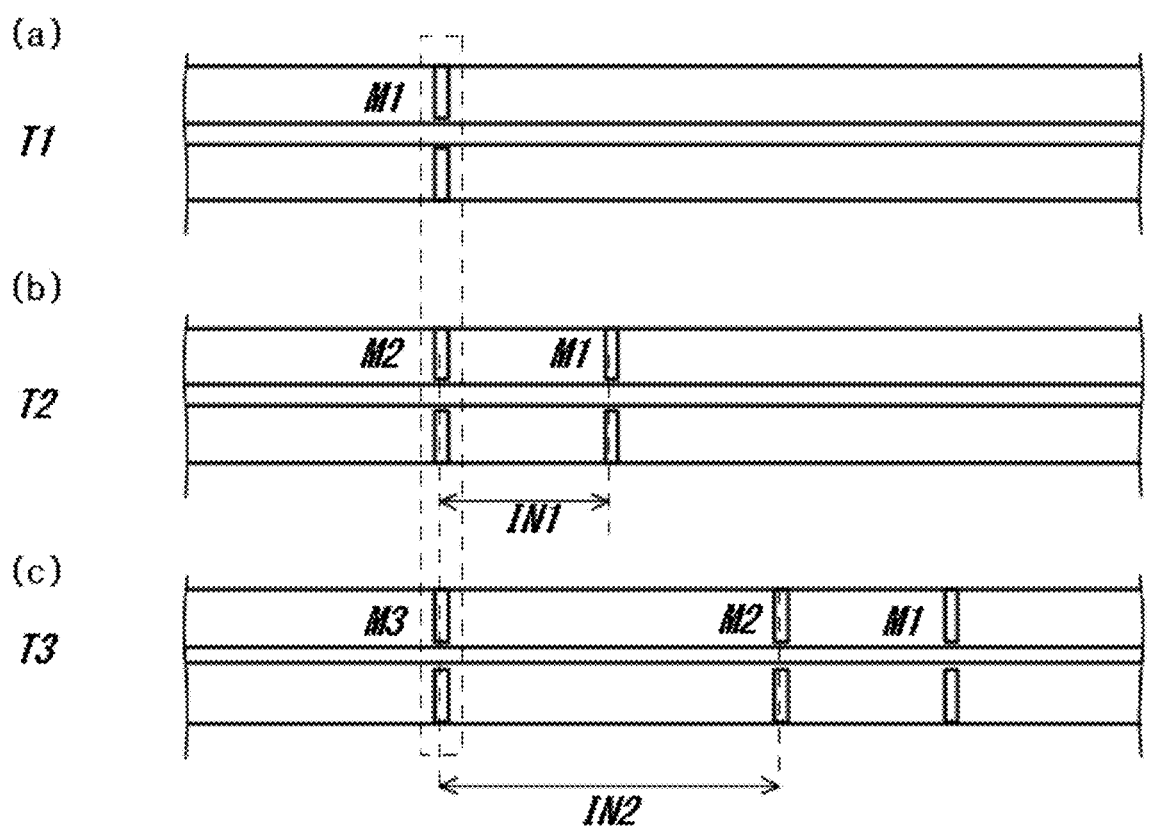
FIG. 11 shows time-series fastener chains to which mark (s) is/are applied by a marking device.
Figure 12:
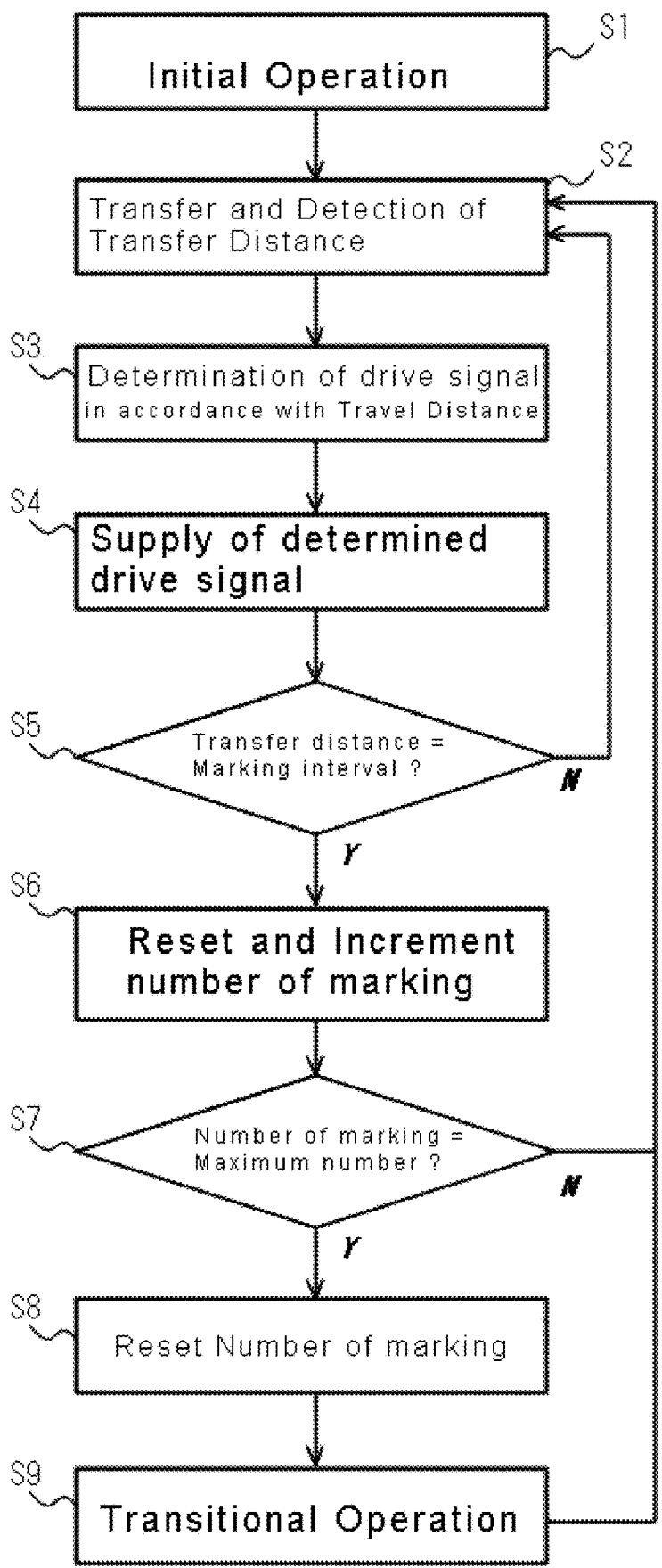
FIG. 12 is a schematic flowchart illustrating a schematic operation of a marking device according to an aspect of the present disclosure.

FIG. 1 is a schematic elevational view of a fastener chain to which plural marks are applied by a marking device. FIG. 2 is a view illustrating a schematic configuration of a marking device. In particular, schematically illustrated is that a marking unit performs a circular motion. FIG. 3 is a schematic view illustrating a locus of circular motion of a marking unit of a marking device. In particular, top dead center (0), midpoint (10) of going travel, bottom dead center (20), and midpoint (30) of returning travel, and an end point (40) on the locus of one round of circular motion of a marking unit are schematically illustrated. The end point (40) matches the top dead center (0). FIG. 4 illustrates a schematic configuration of a marking device taken along a chain double-dashed line IV-IV in FIG. 2. The marking unit is positioned at a top dead center (0) on a locus of circular motion of a marking unit. FIG. 5 illustrates a schematic configuration of a marking device taken along a chain double-dashed line IV-IV in FIG. 2. Unlike the case of FIG. 4, the marking unit is positioned at a bottom dead center (20) on a locus of circular motion of a marking unit. FIG. 6 is a view illustrating a schematic configuration of a marking device. In particular, a manner of arrangement of a XY stage is schematically illustrated. FIG. 7 is a block diagram illustrating a schematic system configuration of a marking device. FIG. 8 illustrates an exemplary table in which relationships are defined between count values indicative of transfer distance of a fastener chain and drive signals corresponding to the count values. FIG. 9 is a schematic view illustrating a portion of an exemplary screen displayed by a monitor of a marking device. FIG. 10 is a schematic time chart for illustrating schematic operation of a marking device, illustrating that drive signal value (DSV) and count value (CV) are changed as a function of time, and count value (CV) is reset by a reset signal (RS). FIG. 11 shows time-series fastener chains to which mark(s) is/are applied by a marking device. FIG. 11 (a) illustrates a fastener chain to which marks are applied at time T1 in FIG. 10; FIG. 11 (b) illustrates a fastener chain to which marks are applied at time T2 in FIG. 10; and FIG. 11 (c) illustrates a fastener chain to which marks are applied at time T3 in FIG. 10. FIG. 12 is a schematic flowchart illustrating a schematic operation of a marking device. FIG. 13 is a schematic chart illustrating a schematic operation of another exemplary marking device, illustrating that drive signal value changes as a function of time and transfer distance.

A marking device described below performs a marking process onto a long object such as a fastener chain 10 disclosed in FIG. 1. By this marking process, marks will be applied to a long object such as a fastener chain 10 disclosed in FIG. 1. This marking process can be performed to a long object at higher speed without stopping the transfer thereof, thus greatly enhancing a marking efficiency onto the long object. In exemplary embodiments of the present disclosure, marking interval can be regulated, and thus improving usability for various applications. It should be noted that a long object to which the marking process will be done by a below-described marking device should not be limited to a fastener chain 10, but may be one elongated plastic tape or metal tape. Plural elongated resin tapes or metal tapes running in parallel can be done by the below-described marking device. A face of a long object onto which the marking process will be done by the marking device may be either one or both faces thereof.

The below-described marking device will be described as an independent marking device relative to other systems or devices. However, an embodiment is envisioned where the below-described marking device is incorporated into other system or device. For example, a marking device may be incorporated into a cutting device for a long object, a taking-up device for a long object, or a heat treatment device for a long object and the like. In a case where a fastener chain 10 of FIG. 1 is processed as a long object, the marking device may be incorporated into a finishing device for manufacturing of slide fastener. For example, this finishing device may perform one or more steps selected from a group consisting of a step of cutting a fastener chain 10, a step of inserting a fastener element of a fastener chain 10 into a slider, and a step of providing a stop member to a fastener tape of a fastener chain 10.

A fastener chain 10 shown in FIG. 1 is one in which first and second fastener stringers 11, 12 are coupled. Each fastener stringer 11, 12 includes a fastener tape 13, 14 and a fastener element 15, 16. The fastener tape 13, 14 may be a flexible woven fabric or knitted fabric or mixture thereof. Side-edge portion of each fastener tape 13, 14 is provided with each fastener element 15, 16. The fastener element 15, 16 may include metal elements, resin elements, a coil element, or any other types of elements. Therefore, the illustrated metal elements should be recognized as an example only.

The fastener chain 10 may include plural spacer portions not illustrated. The spacer portion indicates a portion where the fastener element 15, 16 does not exist and an interspace is arranged between the fastener tapes 13, 14. Alternatively, the spacer portion may indicate a portion where engaged fastener elements 15, 16 are destroyed to be incapable of maintaining the engaged state. In some finishing devices for manufacturing of slide fastener, a fastener chain 10 is cut at a spacer portion. Intervals of spacer portion correspond to lengths of resulting slide fasteners, in particular they are substantially equal.

A fastener chain 10 of FIG. 1 to which marking process is done by a marking device does not include a slider which is normally included in a slide fastener. In a case where a fastener chain 10 to which marking process is done by a marking device is provided with such a slider, a marking device may be arranged downstream of a finishing device that inserts a fastener element of a fastener chain 10 to a slider. In a case where a fastener chain 10 to which marking process is done by a marking device is additionally provided with a stop member, the marking device may be arranged downstream of a finishing device that inserts a fastener element of a fastener chain 10 to a slider and provides a stop member to a fastener tape of the fastener chain 10. In some cases, a finishing device for cutting a fastener chain 10 is arranged downstream of a marking device.

In FIG. 1, marks 17, 18 are applied onto respective fastener tapes 13, 14 of respective fastener stringers 11, 12. The marks 17 are applied with different intervals of a first interval IN1 and a second interval IN2 along an elongated direction of the fastener tape 13. The marks 18 are applied with different intervals of a first interval IN1 and a second interval IN2 along an elongated direction of the fastener tape 14. A marking rule for mark 17 and a marking rule for mark 18 are the same and both marks are applied to respective fastener tapes 13, 14 with the same marking interval. In an envisioned variation, marks 17, 18 are applied based on different marking rules for respective fastener tapes 13, 14, i.e. with different marking intervals. In some cases, different marking devices are prepared for respective fastener tapes 13, 14.

In another envisioned variation, marks 17, 18 are applied onto only one fastener tape 13, 14 of fastener stringers 11, 12. In FIG. 1, marks 17, 18 of the same shape and the same color are applied onto both fastener tapes 13, 14. In an envisioned variation, marks 17, 18 with different shapes and/or different colors for respective fastener tapes 13, 14 are applied.

A marking device 20 shown in FIG. 2 has a driving source 21 and a marking unit 22. The marking device 20 further has a supplying source of ribbon 5, a taking-up device 24 for used ribbon 5, guide rolls 25 for ribbon 5 and a pair of rolls 26 for transferring a fastener chain 10. While the long object (10) is being transferred, marks are applied onto the fastener chain 10 in accordance with a circular motion of the marking unit 22. Transfer direction of the fastener chain 10 substantially matches a tangential direction of locus of circular motion of the marking unit 22. An extent of interference by the marking unit 22 to the transfer of the fastener chain 10 is thus reduced, allowing higher speed transfer of the fastener chain 10. In some cases, a fastener chain 10 is allowed to be transferred at a speed over 10 m/min, resulting in enhanced marking efficiency over conventional one. In a preferred case, the fastener chain 10 is allowed to be transferred at a speed over 40 m/min.

The driving source 21 may be any types of driving source coupled to an independent or external power supply. In the embodiment of the present disclosure, the driving source 21 has a rotational axis 21a, not necessarily limited to this through. The driving source 21 provided with the rotational axis 21a can precisely control a rotational position or rotational amount of the rotational axis 21a in accordance with a drive signal input from a below-described controller 40. In some cases, the driving source 21 is a servomotor. As a servomotor, G5 series produced by OMRON CORPORATION can be used. As would be understood from the following description, a drive signal indicates an absolute position on locus of one round of the marking unit 22, and changes in accordance with increase of transfer distance of the fastener chain 10.

The marking unit 22 performs a circular motion in accordance with a driving force supplied from the driving source 21, and is movable continuously along positions on locus of the circular motion. In more detail, in the embodiment of the present disclosure, the marking unit 22 is positioned by the driving source at a position on the locus directly or indirectly indicated by a drive signal given to the driving source 21. The drive signal changes in accordance with a transfer distance of the fastener chain 10, and therefore the marking unit 22 performs a circular motion continuously along with a time progress in synchronization with the transfer of the fastener chain 10.

In the embodiment of the present disclosure where the driving source 21 has the rotational axis 21a, the marking unit 22 receives a rotational force from the driving source 21 at a non-coaxial position offset to the rotational axis 21a of the driving source 21. Therefore, the marking unit 22 performs a circular motion at a position away from the rotational axis 21a of the driving source 21 by a predetermined radius while maintaining that predetermined radius. The "circular motion" stated in the application should be construed most broadly, and should not be limited to ones stated in relation to specific exemplary embodiments in the present specification. For example, the marking unit 22 may perform a circular motion so as to draw a perfect circle or may perform a circular motion so as to draw an oval. Furthermore, the marking unit 22 may perform a circular motion so as to draw an arc part of a perfect circle or an oval, i.e. may not move the entire length of locus of perfect circle or oval. Variously configured driving unit can be employed for the circular motion of the marking unit 22. In some cases, actuators other than motors can be employed as a driving unit.

FIGS. 2-3 each illustrates a locus L22 of circular motion of the marking unit 22 by a dash-dotted line. On the locus L22 in FIG. 3, absolute positions on the locus of one round of circular motion of the marking unit 22 are shown. In more detail, top dead center (0), midpoint (10) of going travel, bottom dead center (20), and midpoint (30) of returning travel, and an end point (40) on the locus of one round of circular motion of the marking unit 22 are shown. The end point (40) matches the top dead center (0). Drive signal indicates an absolute position on locus of one round of the marking unit 22 and designates a next position on the locus from a present position on the locus of the marking unit 22.

In the exemplary embodiment of the present disclosure, marking process onto a fastener chain 10 is achieved by a combination of circular motion of the marking unit 22 and supplying of ribbon 5. As shown in FIG. 2, the marking unit 22 has at least one protrusion 22p. The protrusion 22p presses, to the side of the fastener chain 10, the ribbon 5 supplied between the marking unit 22 and the fastener chain 10 so that marks 17, 18 are formed as being applied to the fastener chain 10. In a specifically illustrated case, when the marking unit 22 is positioned at the bottom dead center (20), the protrusion 22p of the marking unit 22 presses the ribbon 5 and the fastener chain 10 so that an ink layer of the ribbon 5 is transferred onto the fastener tape 13, 14 of the fastener chain 10. The bottom dead center (20) on the locus L22 corresponds to a marking position by the marking unit 22 using the ribbon 5.

The ribbon 5 includes a base and an ink layer laminated onto the base, and is transferred with the ink layer positioned to the fastener chain 10 side. If the ribbon 5 belongs to a thermal transfer type, the protrusion 22p of the marking unit 22 is heated. In this case, a heat generator to heat the protrusion 22p may be provided in the marking device 20 or in the marking unit 22 or externally of the marking device 20. Heating of the protrusion 22p allows smooth transfer of an ink layer of the ribbon 5 to the fastener chain 10.

The ribbon 5 supplied from a supplying source 23 of ribbon 5 is supplied between the marking unit 22 and the fastener chain 10 through the guide rolls 25. In the illustrated example, the ribbon 5 is supplied so as to run in parallel to the fastener chain 10, and both the ribbon 5 and the fastener chain 10 are pressed by the protrusion 22p of the marking unit 22 when the marking unit 22 is positioned at the bottom dead center (20) on the locus L22. Likewise the transfer of the fastener chain 10, circular motion of the marking unit 22 is continuous, and thus the marking unit 22 is instantaneously present at the bottom dead center (20) on the locus L22. When the marking unit 22 is instantaneously present at the bottom dead center (20), the protrusion 22p of the marking unit 22 instantaneously presses the ribbon 5 and the fastener chain 10 so that an ink layer of the ribbon 5 is transferred onto the fastener tape 13 of the fastener chain 10. If the ribbon 5 belongs to a thermal transfer type, then the heated protrusion 22p may instantaneously presses the ribbon 5 and the fastener chain 10, heat is instantaneously transmitted from the protrusion 22p to the ribbon 5, and the ink layer of the ribbon 5 becomes softer or is melt and is transferred onto the fastener tapes 13, 14.

As described above, pressing of the ribbon 5 and the fastener chain 10 by the protrusion 22p is instantaneous, and an arc extending back and forth from the bottom dead center (20) on the locus L22 of circular motion of the marking unit 22 is directed along the transfer direction of the fastener chain 10. Accordingly, an extent of interference by the marking unit 22 to the transfer of the fastener chain 10 may be reduced.

Used part of the ribbon 5 is taken-up by the taking-up device 24, and an unused part of the ribbon 5 is supplied to the bottom dead center (20) at the marking position. In some cases, the taking-up device 24 operates in synchronization with at least one of marking process by the marking device 20 or circular motion of the marking unit 22 or the transfer of the fastener chain 10. In another case, the taking-up device 24 may continue to take-up the ribbon 5 at a constant speed. In the latter case, the usage efficiency of the ribbon 5 may be lowered.

If the ribbon 5 is stretched between the upstream and downstream guide rolls 25 relative to the marking position corresponding to the bottom dead center (20) on the locus L22, smooth transfer of ink layer of the ribbon 5 may possibly be hindered. In the case of FIG. 2, a pusher 27 is arranged which intermittently pushes a portion of the ribbon 5 between the supplying source 23 of the ribbon 5 and the upstream guide roll 25 so that the ribbon 5 is relaxed between the upstream and downstream guide rolls 25, ensuring more smooth transfer thereof. The pusher 27 can pull out a predetermined length of the ribbon 5 from the supplying source 23. Accordingly, when the ribbon 5 is supplied from the supplying source 23, the ribbon 5 is suppressed from being broken as a result of being stretched due to applied excess force, and stable supply of ribbon 5 is ensured.

In another unillustrated example, it is envisioned that the marking process onto the fastener chain 10 is achieved solely by the circular motion of the marking unit 22. For example, a marking pen, a color marker, or ink injecting unit can be arranged as an alternative to the protrusion 22p of the marking unit 22. In such cases, marking process can be done to the fastener chain 10 without using the ribbon 5.

Regardless of that the marking process onto the fastener chain 10 is achieved solely by circular motion of the marking unit 22, there is no difference as a result that marks are applied onto the fastener chain 10 in accordance with a circular motion of the marking unit 22 while the fastener chain 10 is being transferred, thus obtaining above-described benefits. In particular, an extent of interference by the marking unit 22 to the transfer of the fastener chain 10 is thus reduced, allowing higher speed transfer of the fastener chain 10.

The fastener chain 10 is transferred by the pair of rolls 26. One of the pair of rolls 26 may be a driving roll, and the other one may be a pushing roll. The fastener chain 10 is pushed by the pushing roll to the side of driving roll, is sandwiched between the pushing roll and the driving roll, and is entrained by the rotation of the driving roll. The pair of rolls 26 is arranged downstream of the bottom dead center (20) on the locus L22 of circular motion of the marking unit 22 in the transfer direction of the fastener chain 10. Additionally or alternatively, a pair of rolls may be used which is arranged upstream relative to the bottom dead center (20).

FIGS. 4 and 5 illustrates non-limiting exemplary structures of marking unit 22. As shown in FIGS. 4 and 5, a motor of the driving source 21 has a rotational axis 21a. The marking unit 22 has a body 22r, a pair of protrusions 22p provided at a bottom surface of the body 22r, and an attachment axis 22q arranged at a side surface of the body 22r. A disk-like coupler 28 is arranged between the rotational axis 21a and the attachment axis 22q. The coupler 28 is fixed to the rotational axis 21a, for example. The coupler 28 has a hole arranged non-coaxially relative to the rotational axis 21a, and the attachment axis 22q is fitted into this hole. As a result, the marking unit 22 can receive rotational force from the driving source 21 at a non-coaxial position offset to the rotational axis 21a of the driving source 21, ensuring circular motion of the marking unit 22 radially offset to the rotational axis 21a.

The pair of protrusions 22p may be arranged with an appropriate interspace for marking the fastener tapes 13, 14 respectively. A recess or space between the paired protrusions 22p is arranged to avoid interference between the protrusion 22p and engaged elements 15, 16 of the fastener chain 10. When the marking unit 22 is present at the bottom dead center (20), the engaged elements 15, 16 of the fastener chain 10 is housed partially in the recess or the space between the paired protrusions 22p.

The protrusion 22p may be configured to be movable in up-down direction relative to the body 22r. In this instance, the protrusion 22p may take a state being urged downward by an elastic member such as a spring. Accordingly, when an excess force is applied when the protrusion 22p of the marking unit 22 pushes the ribbon 5 and the fastener chain 10, the protrusion 22p is moved upward against the urging by the elastic member and thus the ribbon 5 is suppressed from being broken.

Coupling between the marking unit 22 and the coupler 28 may be secured by loose fitting between the attachment axis 22q of the marking unit 22 and the hole of the coupler 28. To secure stable circular motion of the marking unit 22, in the exemplary embodiment of the present disclosure, the marking unit 22 is mounted to a fixture 32 via a XY stage 31. In FIG. 4, the XY stage 31 is schematically illustrated by broken line. The XY stage 31 supports the marking unit 22 such that the marking unit 22 is allowed to perform a circular motion. Specific configuration of the XY stage 31 is well-known, and detail description is thus omitted. The fixture 32 may be a portion of a base-frame of the marking device 20 or a sub-frame attached to the base-frame.

X-axis and Y-axis of the XY stage are arranged in a plane that is perpendicular to the rotational axis 21a and/or attachment axis 22q. For example, the X-axis extends along the transfer direction of the fastener chain 10 in the plane, and the Y-axis extends along a direction perpendicular to the X-axis in the plane. FIG. 6 shows that a pair of X-axis rails 31a are arranged in parallel to the transfer direction of the fastener chain 10, and a pair of Y-axis rails 31b are arranged perpendicular to the transfer direction of the fastener chain 10. As would be understood from FIGS. 4 and 5, the Y-axis rails 31b are fixed to the fixture 32. The X-axis rails 31a are arranged movable to the Y-axis rails 31b. The marking unit 22 is arranged movable to the X-axis rails 31a. Locus of circular motion of the marking unit 22 in a plane perpendicular to the rotational axis 21a and/or the attachment axis 22q is expressed by a synthesis of X-axis value and Y-axis value. It should be noted that, in another example, at least one or one or more XY stage can be employed which is configured from a combination of one X-axis rail and one Y-axis rail. In further example, stability of circular motion of the marking unit 22 is secured using other devices than the XY stage 31.

The marking device 20 can continuously apply marks 17, 18 to the fastener chain 10 during the transfer thereof based on circular motion of the marking unit 22 while the fastener chain 10 is transferred by the pair of rolls 26. In the embodiment of the present disclosure, when the marking unit 22 reaches the bottom dead center (20), transfer of ink layer from the ribbon 5 to the fastener chain 10 would be successfully done if there is no failure in supplying the ribbon 5 and any other failures, and this results in the marks 17, 18 applied onto the fastener tapes 13, 14. In another example, the marking device 20 may be configured to be placed at a standby position where the marking unit 22 cannot touch the ribbon 5 even when the marking unit 22 reaches the bottom dead center (20). In this case, even then the marking unit 22 reaches the bottom dead center (20), the ink layer is not necessarily transferred from the ribbon 5 to the fastener chain 10.

In the embodiment of the present disclosure, a transfer speed of the fastener chain 10 can be regulated, and an interval of the mark 17, 18 applied along the fastener chain 10 can be regulated. In another example, the interval of the mark 17, 18 applied along the fastener chain 10 is preset and incapable of being regulated. Such relatively simple operation of the marking device would be understood as being included in a technical scope of the appended Claims at the time of filling of this application.

Referring to FIGS. 7 to 13, more detail description will be made on the marking device 20 according to the embodiment of the present disclosure. As shown in FIG. 7, the marking device 20 has a controller 40, a transfer motor 50, a driving source 21, a transfer distance detector 60, an input device 70, and a monitor 80. The controller 40 includes a CPU 41, a memory 42, and an I/O interface 43. The transfer distance detector 60 includes an encoder 61 and a counter 62. It should be noted that FIG. 7 is a highly simplified block diagram. A driver for controlling the transfer motor 50 may be provided between the controller 40 and the transfer motor 50 or in some cases, the transfer motor 50 includes such a driver. A driver for controlling the driving source 21 may be provided between the controller 40 and the driving source 21 or in some cases, the driving source 21 includes such a driver.

Processing by the controller 40 may be realized by the CPU 41 executing a program stored in the memory 42 or in an internal memory of the CPU 41. Processing speed of CPU 41 may be appropriately determined in accordance with a level of promptness required for the marking device 20. The memory 42 stores a program that is a basis of processing by the controller 40, or stores information that can be used while a program is executed by the CPU 41. The CPU 41 can access to the transfer motor 50, the driving source 21, the transfer distance detector 60, the input device 70 and the monitor 80 via the I/O interface 43.

The controller 40 controls the transfer motor 50 to transfer the fastener chain 10 at a speed designated by a user through the input device 70. Rotational force generated by the transfer motor 50 would be directly or indirectly supplied to a driving roll of the above-described pair of rolls 26. A user can designated a value of transfer speed through the input device 70, and a designated value of transfer speed would be stored in the memory 42. The controller 40 would refer to the designated value of transfer speed stored in the memory 42, and instructs the transfer motor 50 to transfer the fastener chain 10 at the transfer speed.

The transfer distance detector 60 detects a transfer distance of the fastener chain 10 transferred by the above-described pair of rolls 26. In the illustrated example, an encoder 61 is incorporated into one roll of the pair of rolls 26. The encoder 61 converts an analog, i.e. continuous rotational amount of the roll into a non-continuous digital quantity expressed by a pulse number. By using an encoder 61 with an appropriate resolution, it would be possible to precisely detect a transfer distance of the fastener chain 10. Pulses output from the encoder 61 may be counted by the counter 62. The controller 40 references the count value output from the counter 62 to determine a transfer distance of the fastener chain 10. A case is envisioned where a transfer distance can be calculated from the count value, and this calculated transfer distance is used for the following processes, or a case is envisioned where the count value is taken as a transfer distance of the fastener chain 10 and the count value itself is used for the following processes. Hereinafter, the count value and the transfer distance would be described interchangeably.

In the embodiment of the present disclosure, the controller 40 generates a reset signal that resets the count value of the counter 62 each time the marking unit 22 reaches the bottom dead center (20). Accordingly, the controller 40 can know a transfer distance of the fastener chain 10 from a time point when a previous mark was applied.

The controller 40 controls not only the transfer motor 50 but also the driving source 21. In particular, the controller 40 supplies a drive signal to the driving source 21 which indicates an absolute position on the locus of one round of circular motion of the marking unit 22 and which changes in accordance with an increase of transfer distance of the fastener chain 10. An absolute position on the locus of one round of circular motion of the marking unit 22 may be any point on the above-described locus L22 in reference to FIG. 3, and may include the above-described top dead center (0), the midpoint (10) of going travel, the bottom dead center (20), and the midpoint (30) of returning travel, and the end point (40).

In the embodiment of the present disclosure, the driving source 21 may be a motor provided with the rotational axis 21a, and the marking unit 22 performs a circular motion in synchronization with the rotation of the rotational axis 21a. It could therefore be said that a driving signal supplied to the driving source 21 indicates a rotational position of the rotational axis 21a and at the same time, indicates an absolute position on the locus of one round of circular motion of the marking unit 22.

The rotational position of the rotational axis 21a would be understood in light of a reference point on a circumference surface of the rotational axis 21a of the motor. The reference point on the circumference surface of the rotational axis 21a of the motor would be understood to perform a circular motion in accordance with rotation of the rotational axis 21a, similar to the protrusion 22p of the marking unit 22. A drive signal supplied to the driving source 21 indicates an absolute position on locus of one round of circular motion of the reference point at the circumference surface of the rotational axis 21a, as would be understood similar to FIG. 3.

In the embodiment of the present disclosure, the drive signal increases as a transfer distance of the fastener chain 10 increases. The controller 40 can know the transfer distance of the fastener chain 10 at a point of time from the transfer distance detector 60. The controller 40 would be able to determine variously a drive signal that corresponds to the transfer distance of the fastener chain 10 at a point of time. It is also envisioned that a system is configured, assuming that the fastener chain 10 is transferred at a constant speed, and thus a transfer time period of the fastener chain 10 indicates a transfer distance of the fastener chain 10. However, there is a possibility that a discordance occurs between a transfer time period and an actual transfer distance. Much accurate marking would be realized by determining the position on the locus L22 of the marking unit 22 in synchronization with a detected transfer distance of the fastener chain 10.

Count value of the counter 62 increases as a transfer distance of the fastener chain 10 increases. A drive signal indicating an absolute position on the locus of one round of circular motion of the reference point at the circumference surface of the rotational axis 21a would change in accordance with an increase of transfer distance of the fastener chain 10, i.e. changes in accordance with a count value of the counter 62.

In some cases, a table defining relationship of transfer distance and drive signal is prepared and a drive signal may be read which corresponds to a current transfer distance. In some cases, a current transfer distance is introduced to an algorithm or a mathematical formula and a drive signal is obtained as an output of the algorithm or as a solution of the mathematical formula. It should be noted that, in some cases, transfer distance is replaced by count value of the counter 62.

FIG. 8 shows an exemplary table describing relationship of the count value indicating transfer distance of fastener chain and drive signal corresponding to the count value. This table may be stored in the memory 42 or in an internal memory of CPU 41, for example. In the table of FIG. 8, a drive signal is determined corresponding to a range of count values from the counter 62. A case is envisioned where a drive signal is determined for each count value from the counter 62.

In a case of FIG. 8, for example, the CPU 41 reads out a drive signal indicating a position "2" which corresponds to a range of count values 10-20 from the counter 62. When this drive signal is supplied to the driving source 21, rotational position of the rotational axis 21a is controlled such that the marking unit 22 moves to the position 2 on the locus L22. The drive signal indicates an absolute position on locus of one round of circular motion of the marking unit 22. The position "2" stated in this paragraph is a position on the locus between the top dead center "0" and the bottom dead center "20".

With reference to FIGS. 9-11, a case would be well understood where marks 17, 18 are applied onto the fastener chain 10 at different intervals. FIG. 9 is a display example displayed on the monitor 80. A user can set a value of first marking interval by using the input device 70, can set a value of second marking interval independently of the first marking interval, and can set a value of third marking interval independently of the first and second marking intervals.

The display of FIG. 9 includes an icon for adding marking and an icon for deleting marking, and increase and decrease of marking interval is possible. The first marking interval indicates an interval from an initial position or an initial mark to 1st or next mark. The marking unit 22 is controlled to be positioned at the bottom dead center (20) on the locus L22 when a transfer distance of the fastener chain 10 at a given time matches the first marking interval. It should be similarly understood for the second and third marking intervals. FIG. 9 also shows a transfer-speed regulating icon for regulating a transfer speed of the fastener chain 10. By clicking this icon, an icon would be displayed for increasing or decreasing a transfer speed that is displayed above the clicked icon.

In FIG. 10, a lateral axis indicates time, and a vertical axis indicates level of a drive signal value (DSV), a count value (CV), and a reset signal (RS). For promoting easier understanding, the drive signal value (DSV) and the count value (CV) are illustrated as analog-based linear changes, but they actually change step-wise.

As described above, the controller 40 generates a reset signal that resets a count value of the counter 62 each time the marking unit 22 reaches the bottom dead center (20). The count value indicates a transfer distance of the fastener chain 10 from a point of time when a mark was applied.

At time t1 in FIG. 10, a mark M1 is applied to the fastener chain 10; at time T2 a mark M2 is applied to the fastener chain 10; and at time T3 a mark M3 is applied to the fastener chain 10. FIG. 11 (a) illustrates a fastener chain to which marks are applied at time T1 in FIG. 10; FIG. 11 (b) illustrates a fastener chain to which marks are applied at time T2 in FIG. 10; and FIG. 11 (c) illustrates a fastener chain to which marks are applied at time T3 in FIG. 10.

As would be understood from FIG. 11, an interval IN1 between the marks M1 and M2 and an interval IN2 between the marks M2 and M3 are different. This indicates that circular motion speed of the marking unit 22 between the time T1 and the time T2 is different from circular motion speed of the marking unit 22 between the time T2 and the time T3, as the fastener chain 10 is transferred at a constant speed. In particular, the interval IN2 between the marks M2 and M3 is greater than the interval IN1 between the marks M1 and M2, and therefore circular motion speed of the marking unit 22 between the time T2 and the time T3 is slower than circular motion speed of the marking unit 22 between the time T1 and T2.

In a time period between the time T1 and the time T2 in FIG. 10, a value of the drive signal changes relatively greatly per unit time, resulting in faster circular motion of the marking unit 22. Due to the narrower marking interval, the marking unit 22 is required to move faster in time on the locus L22. In a time period between the time T2 and the time T3, a drive signal changes relatively moderately per unit time, resulting in slower circular motion of the marking unit 22. Due to the wide marking interval, the marking unit 22 is required to move slowly in time on the locus L22.

Regardless of the change in marking interval, a distance along the locus L22 of one round of circular motion of the marking unit 22 is constant. Accordingly, if the fastener chain 10 is transferred at a constant speed, then the marking unit 22 would be forced to perform a circular motion at slower speed in accordance with an increase of marking interval, or the marking unit 22 would be forced to perform a circular motion at faster speed in accordance with a decrease of marking interval.

In FIG. 10, a drive signal on the vertical axis is illustrated to change between "0", "20" and "40" where "0" corresponds to the top dead center shown in FIG. 3, and "20" corresponds to the bottom dead center, and "40" corresponds to the end point. In some cases, a drive signal is a digital signal indicating a position on locus of the marking unit 22, e.g. 3-bit digital signal. A position on locus of the marking unit 22 is represented by this 3-bit digital signal. The driving source 21 construes the 3-bit digital signal and performs. The reason why the drive signal has been illustrated to change in a range of 0 to 40 in the present specification and figures is that a position indicated by a drive signal could be more easily understood in conjunction with FIG. 3, and thus this would be understood as a convenience mainly for facilitating easier understanding. It should be noted that, in another example, a drive signal can be an analog signal.

A slope of drive signal in FIG. 10 particularly represents continuous circular motion of reference point on the rotational axis 21a and continuous circular motion of the marking unit 22. If the time of the lateral axis in FIG. 10 is replaced by an accumulated transfer distance of the fastener chain 10, it would also be possible to understand that the drive signal changes in accordance with the accumulated transfer distance of the fastener chain 10. An embodiment is envisioned where a count value of the counter 62 is not reset each time of application of mark.

In the embodiment of the present disclosure, a time period during which the marking unit 22 performs a circular motion so as to apply a Mth mark (M indicates two or more integer) to the fastener chain 10 includes a time period during which the marking unit 22 performs a circular motion at a speed that is in accordance with a distance between a M−1th mark and the Mth mark. When the marking unit 22 performs a circular motion to apply 2nd mark M2, the marking unit 22 performs a circular motion at a speed V2 that is in accordance with a distance between 1st mark M1 and 2nd mark M2. When the marking unit 22 performs a circular motion to apply 3rd mark M3, the marking unit 22 performs a circular motion at a speed V3 that is in accordance with a distance between 2nd mark M2 and 3rd mark M3. As the interval between marks M1 and M2 is less than the interval between marks M2 and M3, the speed V2 is greater than the speed V3.

Relationship between transfer distance and drive signal can be determined through mathematical calculation, for example. The absolute length of locus of one round of circular motion of the marking unit 22 is constant. Also, transfer speed of the fastener chain 10 and marking intervals can be set in advance. For facilitating easier understanding, simple models A, B and C are described below. Precondition is that transfer speed of the fastener chain 10 is 1 m/s, and the absolute length of the locus is 1 m. In model A, a marking interval is 1 m. When transfer distance=10 cm, the marking unit 22 should be positioned at 10 cm on the locus. When transfer distance=10 cm, a drive signal designates a position at 10 cm on the locus for the marking unit 22. In model B, a marking interval is 0.5 m. When transfer distance=10 cm, the marking unit 22 should be positioned at 20 cm on the locus. When transfer distance=10 cm, a drive signal designates a position at 20 cm on the locus for the marking unit 22. Accordingly, it would be possible to understand that circular motion speed of the marking unit 22 would be faster in the model B where marking interval is shorter than that of model A. In model C, a marking interval is 2 m. When transfer distance=10 cm, the marking unit 22 should be positioned at 5 cm on the locus. When transfer distance=10 cm, a drive signal designates a position at 5 cm on the locus for the marking unit 22. Accordingly, it would be possible to understand that circular motion speed of the marking unit 22 would be slower in the model C where marking interval is longer than that of model A. As such, relationship of transfer distance and drive signal could be expressed by mathematical formula.

It is substantial that a mark will be applied when a target transfer distance is detected. It is not a requisite that a position of the marking unit 22 changes in proportion to an increase of transfer distance. An embodiment is envisioned where position of the marking unit 22 changes based on quadratic function regarding increase of transfer distance.

In some cases, the controller 40 stores a table in a memory which describes a relationship of transfer distance and corresponding drive signal, and reads out from the table and supplies to the driving source 21 a drive signal corresponding to a count value sequentially input from the transfer distance detector 60. Each time a count value is input from the transfer distance detector 60, the controller 40 may be configured to determine, using algorithm or formula, a drive signal which corresponds to the count value.

Operation of the marking device 20 will be further described with reference to FIG. 12. It should be noted that FIG. 12 preconditions the followings. Plural slide fasteners are obtained from a fastener chain 10. Each slide fastener has a constant length. The fastener chain 10 is a succession of unit portions each corresponding to one slide fastener. Each unit portion has the identical unit distance in an elongated direction of the fastener chain 10. Marks will be applied to each unit portion on the basis of identical rule.

Firstly, the marking device 20 takes an initial operation (S1). The initial operation could be variously done. For example, the marking device 20 may locate the marking unit 22 at the bottom dead center (20) on the locus L22. The protrusion 22p of the marking unit 22 is positioned at a starting point of a length of unit portion in the fastener chain 10 which corresponds to one slide fastener. Because the marking unit 22 is present at the bottom dead center (20) on the locus L22, the ribbon 5 and the fastener tapes 13, 14 are pushed between the protrusion 22p of the marking unit 22 and a stage (not-illustrated), and an ink layer of the ribbon 5 is transferred onto the fastener tapes 13, 14.

Next, the marking device 20 performs transferring and detecting of transfer distance (S2). In more detail, the controller 40 instructs the transfer motor 50 to transfer the fastener chain 10 at a speed designated by a user. The transfer distance detector 60 is active, and notifies a transfer distance of the fastener chain 10 to the controller 40. More specifically, a value of the counter 62 is input to the controller 40. It is envisioned that transfer distance is calculated from the count value, and this calculated transfer distance is used.

Next, the marking device 20 determines a drive signal that is in accordance with a sequentially changing transfer distance (S3). More specifically, the controller 40 determines a drive signal that is in accordance with a count value input from the transfer distance detector 60. In a case where a table is prepared in advance which describes a relationship of count value and drive signal, the controller 40 reads out from the table and supplies to the driving source 21 a drive signal corresponding to the input count value. If such a table is not prepared in advance, the controller 40 may use algorithm or formula written in a program being executed by the CPU 41, or algorithm or formula stored in the memory 42, or a table stored in the memory 42 to determine a drive signal corresponding to the count value.

Next, the marking device 20 supplies the determined drive signal to the driving source 21 (S4). More specifically, the controller 40 supplies the determined drive signal to the driving source 21. The driving source 21 operates to locate the marking unit 22 at an absolute position on the locus L22 as designated by the drive signal. As such, the marking unit 22 moves on the locus L22 in accordance with sequentially changing transfer distance of the fastener chain 10.

Next, the marking device determines if the transfer distance matches the marking interval (S5). More specifically, the controller 40 determines if a count value input from the transfer distance detector 60 matches a predetermined value indicating a marking interval. In a case where transfer distance is determined from count value, the controller 40 determines if the transfer distance matches the marking interval. If both do not match, flow returns to the step S2. If both match, the controller 40 resets the counter and increments the number of marking (S6). By resetting the counter, a target distance can be measured from a position where the mark has presently been applied to the fastener chain 10 to a target position at which next mark should be applied. The number of marking may indicate a total number of marking process which have been done. For example, the number of marking after the mark M3 has been applied will be "3". Counting the total number of marking process would allow us to manage the number of marking process in each unit portion in the fastener chain 10 which corresponds to one slide fastener.

After that, the marking device determines if the number of marking matches the maximum number (S7). This maximum number is a demanded number for marking process in each unit portion in the fastener chain 10 which corresponds to one slide fastener. For example, if one wishes to apply total 3 marks onto each unit portion in the fastener chain 10 which corresponds to one slide fastener, the maximum number=3. If the number of marking does not match the maximum number, then the flow returns to the step S2. If the number of marking matches the maximum number, the number of marking would be reset (S8), and transitional operation will be performed (S9). In the transitional operation, an operation will be done which is required for transition from the previous unit portion to the current unit portion. For example, in the transitional operation, the marking unit 22 is controlled to perform a circular motion at a speed that is in accordance with a predetermined transfer distance of the fastener chain 10 from the final mark in the previous unit portion to a starting point or 1st mark in the current unit portion.

Figure 13:
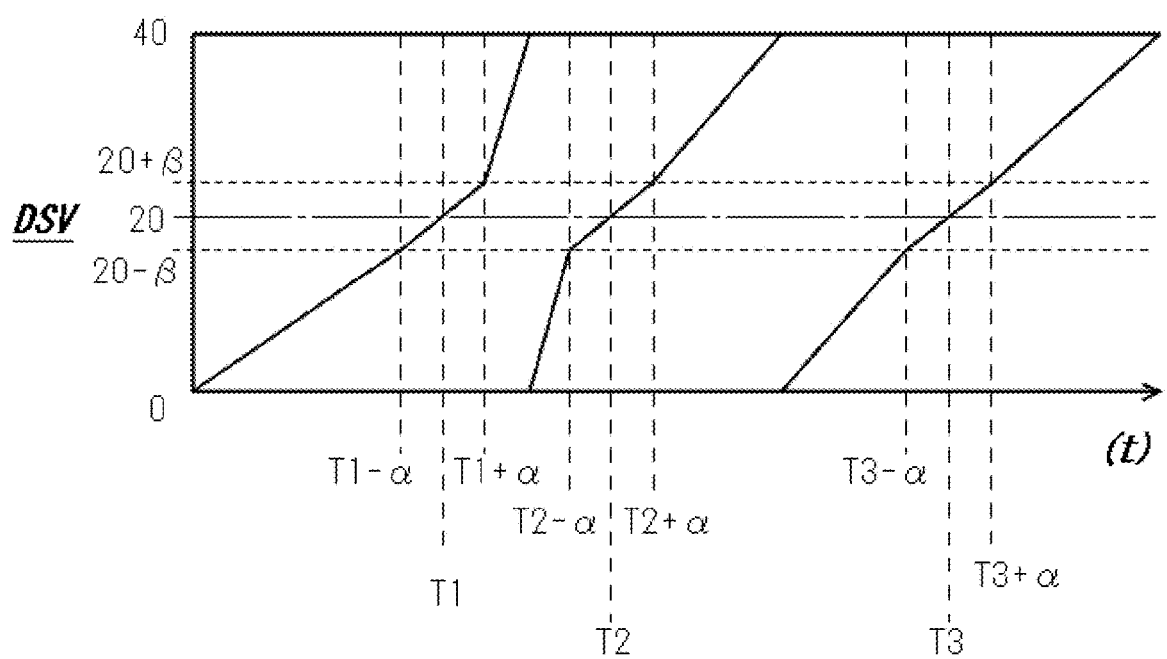
FIG. 13 is a schematic chart illustrating a schematic operation of another exemplary marking device, illustrating that drive signal value changes as a function of time and transfer distance.

FIG. 13 is a schematic time chart for describing schematic operation of a marking device of different example than that of FIGS. 1-11, illustrating that a value of drive signal changes as a function of time and transfer distance. As would be understood from FIG. 13, circular motion speed of the marking unit 22 would be substantially equal to a transfer speed of the fastener chain 10 when the marking unit 22 performs a circular motion to approach the fastener chain 10 and when the marking unit 22 performs a circular motion to be away from the fastener chain 10. Accordingly, an interference by the marking unit 22 to the transfer of the fastener chain 10 would be further reduced, and faster speed transfer of fastener chain 10 would be further facilitated. An embodiment is envisioned where circular motion speed of the marking unit 22 is set to be equal to a transfer speed of the fastener chain 10 only when the marking unit 22 performs a circular motion to approach the fastener chain 10 and only when the marking unit 22 performs a circular motion to be away from the fastener chain 10.

FIG. 13 assumes that the fastener chain 10 is transferred at a constant speed. In a range between T1−α to T1+α, the drive signal is set such that circular motion speed of the marking unit 22 is set to be substantially equal to a transfer speed of the fastener chain 10, and the marking unit 22 performs a circular motion at a first speed from a position (20−β) in advance of the bottom dead center (20) to a position (20+β) posterior to the bottom dead center (20). In a range between T2−α to T2+α, the drive signal is set such that circular motion speed of the marking unit 22 is set to be substantially equal to a transfer speed of the fastener chain 10, and the marking unit 22 performs a circular motion at a first speed from a position (20−β) in advance of the bottom dead center (20) to a position (20+β) posterior to the bottom dead center (20). In a range between T3−α to T3+α, the drive signal is set such that circular motion speed of the marking unit 22 is set to be substantially equal to a transfer speed of the fastener chain 10, and the marking unit 22 performs a circular motion at a first speed from a position (20−β) in advance of the bottom dead center (20) to a position (20+β) posterior to the bottom dead center (20).

In a case where count value increases as the fastener chain 10 is transferred and the count value is reset at a target count value at which the mark is applied, a drive signal supplied to the driving source 21 has a constant changing amount in the starting range and ending range of count value, and this changing amount is set such that the circular motion speed of the marking unit 22 is equal to the transfer speed of the fastener chain 10.

More specifically, in a starting time period in a circular motion time period so as to apply 2nd mark, i.e. in a time period between time T1 to time T1+α, a changing amount of drive signal per unit transfer distance is a first amount, and the circular motion speed of the marking unit 22 matches the transfer speed of the fastener chain 10. In an ending time period in the circular motion time period so as to apply 2nd mark, i.e. in a time period between time T2 to time T2+α, a changing amount of drive signal per unit transfer distance is a first amount, and the circular motion speed of the marking unit 22 matches the transfer speed of the fastener chain 10. In an intermediate time period in the circular motion time period so as to apply 2nd mark, i.e. in a time period between time T1+α to time T2−α, a changing amount of drive signal per unit transfer distance is a second amount that is greater than the first amount, and the circular motion speed of the marking unit 22 does not match the transfer speed of the fastener chain 10, i.e. the circular motion speed of the marking unit 22 is greater than the transfer speed of the fastener chain 10. This indicates that regardless of short marking interval, the transfer speed of the fastener chain 10 is not required to be reduced.

In the above-described intermediate time period, i.e. in a time period between time T1+α to time T2−α, when the marking unit 22 performs a circular motion so as to apply 2nd mark onto the fastener chain 10, the marking unit 22 performs a circular motion at a speed that is in accordance with a distance between the 1st mark and the 2nd mark. It could be said that, in FIG. 13 either, similar to FIG. 10, when the marking unit 22 performs a circular motion so as to apply a Mth mark (M indicates two or more integer) to the fastener chain 10, included is a time period during which the marking unit 22 performs a circular motion at a speed that is in accordance with a distance between a M−1th mark and the Mth mark.

As would be understood from the above descriptions, the controller 40 uses a drive signal that changes in accordance with a transfer distance such that the circular motion speed of the marking unit 22 matches the transfer speed of the fastener chain 10 in the starting and ending time periods in the circular motion time period so as to apply Nth mark (N indicates one or more integer). In some cases, a table is prepared which defines relationship between transfer distance and drive signal. In starting and ending ranges of a transfer distance, a drive signal is set to change such that circular motion speed of the marking unit 22 matches the transfer speed of the fastener chain 10. In an intermediate range of the transfer distance, a drive signal is set such that the marking unit 22 moves a distance from an end point of the starting range to a starting point of the ending range.

In a starting range of count values corresponding to the time period between time T1 to time T1+α, a starting range of count values corresponding to the time period between time T2 to time T2+α, and a starting range of count values corresponding to the time period between time T3 to time T3+α, a drive signal will be a value that is configured to set the circular motion speed of the marking unit 22 equal to the transfer speed of the fastener chain 10.

In an ending range of count values corresponding to the time period between time T1−α to time T1, an ending range of count values corresponding to the time period between time T2−α to time T2, and an ending range of count values corresponding to the time period between time T3−α to time T3, a changing amount of drive signal per increase of count value will be a value that is configured to set the circular motion speed of the marking unit 22 equal to the transfer speed of the fastener chain 10.

Target count value is known which corresponds to a timing when a mark is applied. Threshold regarding transition from the starting range to the intermediate range or threshold regarding transition from the intermediate range to the ending range can be determined properly. It is not necessarily required for the threshold regarding transition from the starting range to the intermediate range and the threshold regarding transition from the intermediate range to the ending range to have the same absolute value.

By referring the count value, a transitional timing from the starting range to the intermediate range can be detected, and also a transitional timing from the intermediate range to the ending range can be detected. An embodiment is envisioned where it is switched to use another algorithm or mathematical formula or still further another table in accordance with the transitional timing.

Just in case, referring to FIG. 8, when a target count value=50, count values 0-10 forms a starting range, count values 10-40 forms an intermediate range, and count values 40-50 forms an ending range. In the starting and ending ranges, a drive signal changes in accordance with the transfer speed of the fastener chain 10. For example, a drive signal is incremented by one in accordance with one increment of count value. In the intermediate range, a drive signal changes in accordance with a distance calculated by subtracting transfer distances of the starting and ending ranges from a marking interval. For example, a drive signal is incremented by two in accordance with one increment of count value. A case where a drive signal is incremented by three in accordance with one increment of count value indicates that a marking interval is shorter compared with a case where a drive signal is incremented by two in accordance with one increment of count value.

In a case where an encoder does not show a precise transfer distance, it is envisioned that count value of counter is multiplied by a coefficient and this resulting count value obtained by the multiplying is used. For example, a coefficient of 1.001 to 1.009 is used to correct a measurement error in an encoder.

Figure 14:
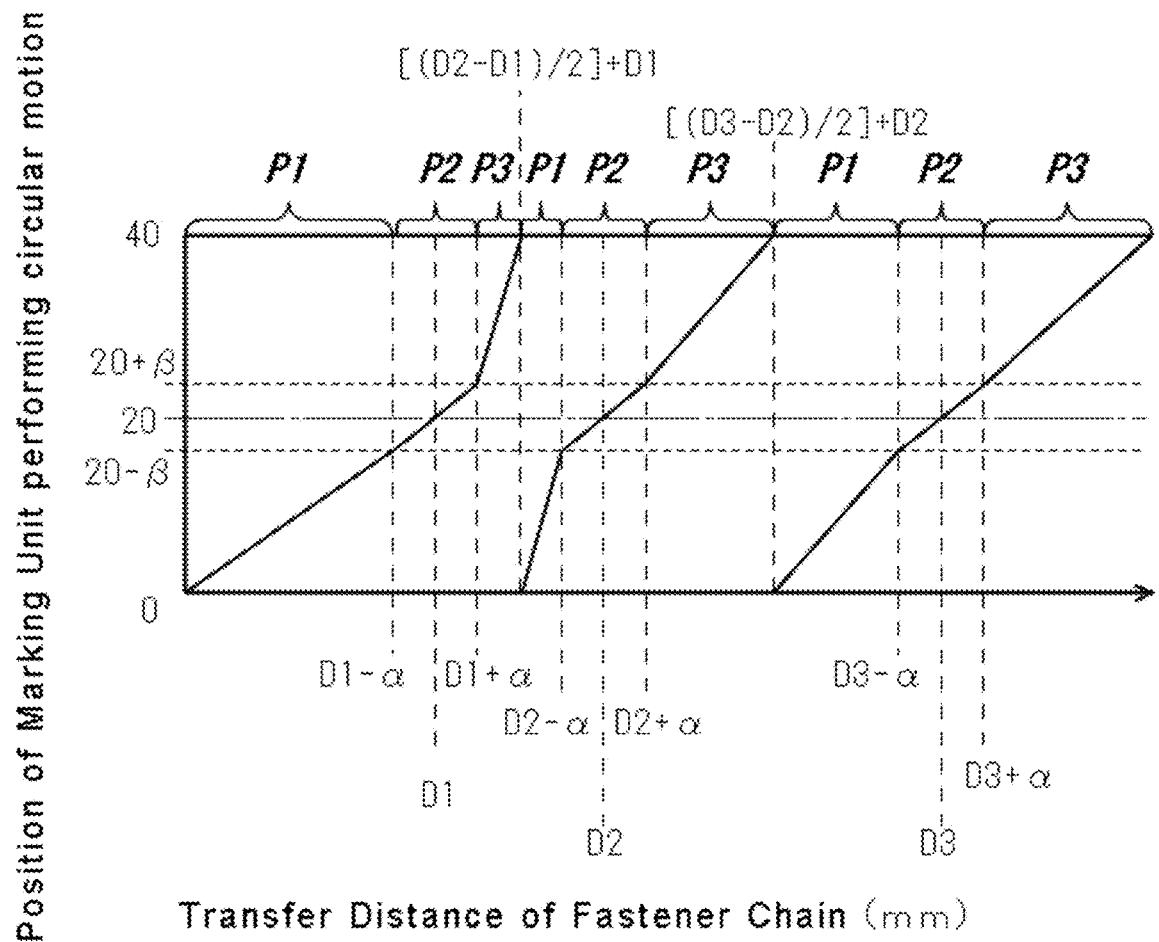
FIG. 14 is a schematic flowchart for illustrating a schematic operation of a marking device from another point of view, illustrating that a position in circular motion of the marking device is changed as a function of a transfer distance.
Figure 15:
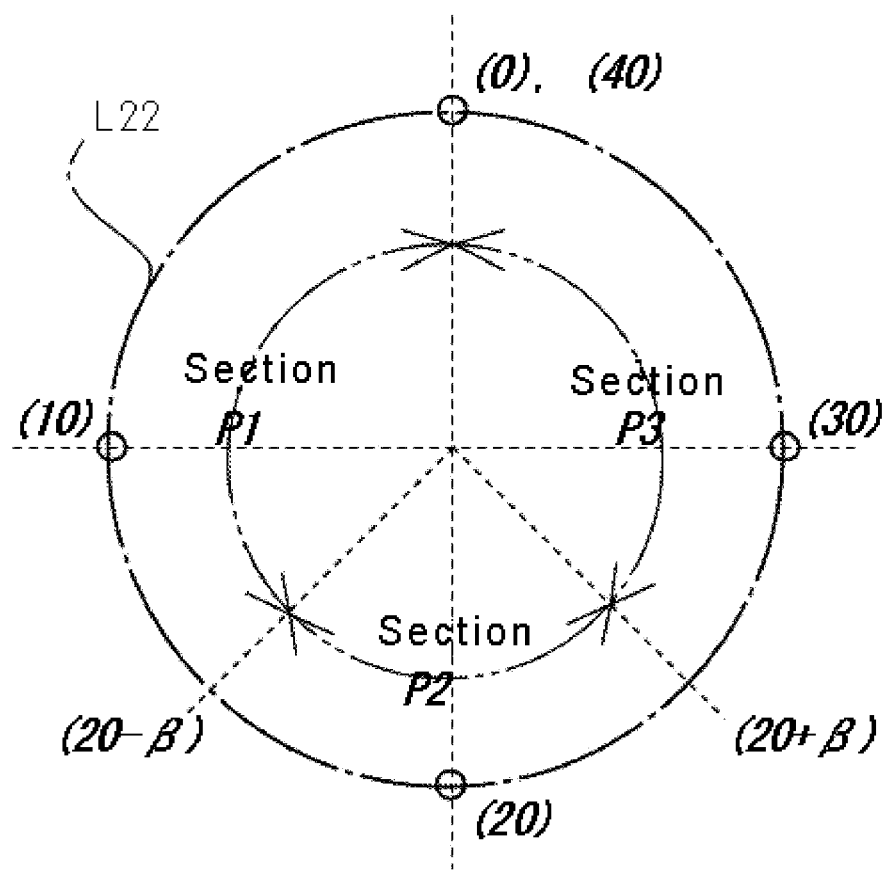
FIG. 15 is a schematic view illustrating a locus of circular motion of a marking unit of a marking device, illustrating that the locus of circular motion of the marking unit is divided into first to third sections.

Description of control of position of marking unit performing a circular motion would be followed from a different point of view with reference to FIGS. 14-15. FIG. 14 is a schematic flowchart for illustrating a schematic operation of a marking device from another point of view, illustrating that a position in circular motion of the marking device is changed as a function of a transfer distance. FIG. 15 is a schematic view illustrating a locus of circular motion of a marking unit of a marking device, illustrating that the locus of circular motion of the marking unit is divided into first to third sections.

In FIG. 14, a vertical axis indicates a position on the locus of one round of circular motion of the marking unit, and the lateral axis indicates a transfer distance of a fastener chain. It should be noted that, as the fastener chain is transferred at a constant speed, a change of drive signal value (DSV) shown in FIG. 13 would be substantially identical to a change of position in circular motion of marking unit shown in FIG. 14. Furthermore, time points T1-T3 in FIG. 13 substantially corresponds to the transfer distances D1-D3 in FIG. 14. As shown in FIGS. 14 and 15, a range of position in circular motion of marking unit can be divided into first to third sections P1-P3. In each section, different formula can be used to determine a position of marking unit performing a circular motion. That is, a drive signal value (DSV) can be determined by a different formula by the controller.

Use of various mathematical formulas can be studied for determining a position of a marking unit performing a circular motion. The following formulas can be used as an example. When A represents a transfer distance of fastener chain, and B represents a position on locus of one round of marking unit, the following formula 1 can be used for determining B from A in the first section P1. The following formula 2 can be used for determining B from A in the second section P2. The following formula 3 can be used for determining B from A in the third section P3. In another example, another formula can be used.

$$B = A \times (20-\beta)/(D1-\alpha) \quad \text{[Formula 1]}$$

$$B = (A-(D1-\alpha)) \times ((20+\beta)-(20-\beta))/(D1+\alpha)-(D1-\alpha)) + (20-\beta) \quad \text{[Formula 2]}$$

$$B = (A-(D1+\alpha)) \times ((40-(20+\beta))/((((D2-D1)/2)+D1)-(D1+\alpha))+(20+\beta) \quad \text{[Formula 3]}$$

Given the above teachings, a skilled person in the art would be able to add various modifications to the respective embodiments. Reference codes in Claims are just for reference and should not be referred for the purpose of narrowly construing the scope of claims.

REFERENCE SIGNS LIST

10 Fastener chain (Long object)
11 First fastener stringer
12 Second fastener stringer
13 Fastener tape
14 Fastener tape
20 Marking device
21 Driving source
22 Marking unit
23 Supply source of ribbon
24 Take-up device for used ribbon
25 Guide roll
26 Pair of rolls for transferring fastener chain

The invention claimed is:

1. A marking device for performing a marking process onto a long object, comprising:
   a driving source; and
   a marking unit that performs a circular motion in accordance with a driving force supplied from the driving source, wherein
   while the long object is being transferred, marks are applied onto the long object in accordance with the circular motion of the marking unit, and
   a time period during which the marking unit performs one circular rotation so as to apply an Mth mark (M indicates two or more integers) onto the long object includes a time period during which a speed of the circular motion of the marking unit is in accordance with a distance between an M−1th mark and the Mth mark.

2. The marking device according to claim 1, wherein a circular motion speed of the marking unit is set to be substantially equal to a transfer speed of the long object at least when the marking unit performs a circular motion so as to approach the long object.

3. The marking device according to claim 1, further comprising:
   a controller that supplies to the driving source a drive signal that indicates an absolute position on a locus of one round of circular motion of the marking unit and that changes in accordance with an increase of transfer distance of the long object.

4. The marking device according to claim 1, wherein the driving source has a rotational axis, and the marking unit receives a rotational force from the driving source at a non-coaxial position offset to the rotational axis of the driving source.

5. The marking device according to claim 4, further comprising:
   a XY stage that supports the marking unit such that the marking unit is allowed to perform a circular motion.

6. The marking device according to claim 1, wherein the marking unit has at least one protrusion, and one of the marks is formed through the protrusion pressing, to a side of the long object, a ribbon supplied between the marking unit and the long object.

7. The marking device according to claim 1, wherein the long object is a slide fastener, or a fastener chain for slide fastener, or a fastener stringer for slide fastener.

8. A marking method of performing a marking process onto a long object, comprising:

transferring the long object by at least a pair of rolls; and continuously applying marks onto the long object, while the long object is being transferred, based on a circular motion of a marking unit, wherein a time period during which the marking unit performs one circular rotation so as to apply an Mth mark (M indicates two or more integers) onto the long object includes a time period during which a speed of the circular motion of the marking unit is in accordance with a distance between an M−1th mark and the Mth mark.

9. The marking method according to claim 8, wherein a circular motion speed of the marking unit is set to be substantially equal to a transfer speed of the long object at least when the marking unit performs a circular motion so as to approach the long object.

10. The marking method according to claim 8, further comprising:

detecting a transfer distance of the long object while the long object is being transferred; and supplying a drive signal to a driving source that provides a driving force to the marking unit, wherein the drive signal indicates an absolute position on a locus of one round of circular motion of the marking unit and changes in accordance with an increase of the detected transfer distance of the long object.

11. The marking method according to claim 8, wherein the marking unit has at least one protrusion, and one of the marks is formed through the protrusion pressing, to a side of the long object, a ribbon supplied between the marking unit and the long object.

12. The marking method according to claim 8, wherein the long object is a slide fastener, or a fastener chain for slide fastener, or a fastener stringer for slide fastener.

13. A method of manufacturing a fastener chain in which plural marks are applied along its elongated direction, the method comprising:

transferring the fastener chain by at least a pair of rolls; and continuously applying marks onto at least one fastener tape of the fastener chain based on a circular motion of a marking unit, wherein a time period during which the marking unit performs one circular rotation so as to apply an Mth mark (M indicates two or more integers) onto the at least one fastener tape includes a time period during which a speed of the circular motion of the marking unit is in accordance with a distance between an M−1th mark and the Mth mark.

14. The method of manufacturing a fastener chain according to claim 13, wherein a circular motion speed of the marking unit is set to be substantially equal to a transfer speed of the fastener chain at least when the marking unit performs a circular motion so as to approach the fastener chain.

* * * * *